United States Patent Office.

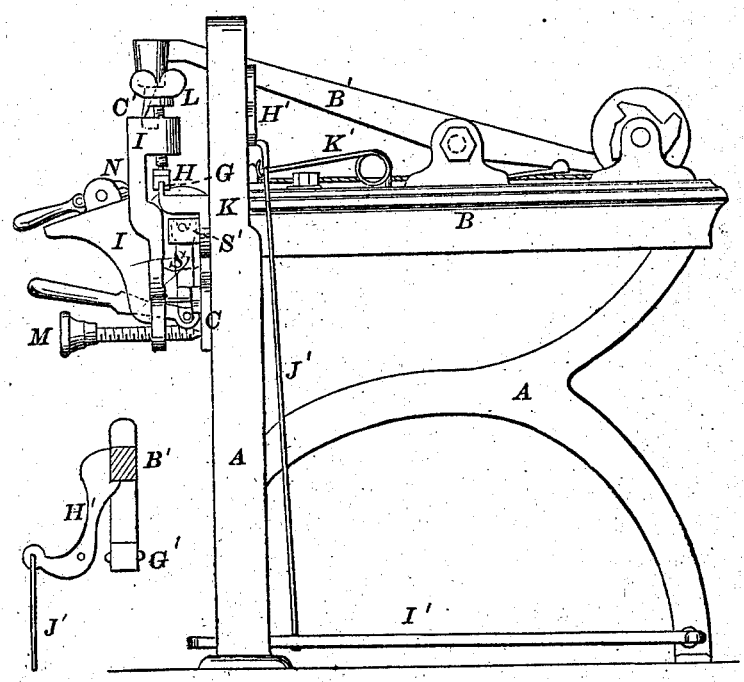

IMPROVED MACHINE FOR CUTTING SICKLE SECTIONS.

SAMUEL C. HALL, OF WHITE WATER, WISCONSIN.

Letters Patent No. 60,180, dated December 4, 1866.

SPECIFICATION.

TO ALL WHOM IT MAY CONCERN:

Be it known that I, SAMUEL C. HALL, of White Water, in the county of Walworth, and State of Wisconsin, have invented an Improved Machine for Cutting Sickle Sections and Files; and I do hereby declare that the following is a full, clear, and exact description thereof, reference being had to the accompanying drawings, making a part of this specification, in which—

Figure 1 is an elevation of the front part of the machine.
Figure 2 is a plan view of the front part of the machine.
Figure 3 is an elevation of one side of the same.
Figure 4 is a section in detail, taken in the plane indicated by red line $x\ x$, fig 3.
Figure 5 is a top view of a sickle section.

Similar letters of reference indicate corresponding parts in the several figures.

The object of this invention is to obtain a machine which will serrate or cut the bevelled edges of sickle sections for reaping and mowing machines, and which may be used, if desired, for cutting files.

The nature of my invention consists mainly in a machine which is adapted for sustaining sickle sections firmly in position during the operation of the chisel in cutting serrations in their bevelled surfaces or edges, as will be hereinafter described. It also consists in sustaining sickle sections to be cut upon an inclined bed, which is automatically moved in a right line, and at right angles, or nearly so, to the length of the chisel arm during the cutting operation; said inclined bed being so constructed and supported as to admit of being adjusted and adapted to the various sizes and shapes of the blades or sections to be cut, as will be hereinafter described. It also consists in sustaining the sickle sections in position to be cut upon a movable bed or table, which can be detached from the machine, raised or lowered or inclined at any required angle, as may be found necessary, as will be hereinafter described.

I am aware that it is not new to employ vibrating chisel arms in conjunction with tables moving in horizontal planes, or cylindrical beds revolving about a centre, for cutting files, and therefore I do not lay claim to such devices. My invention is designed for adapting a machine for cutting sickle sections or acute angular plates having bevelled cutting edges, which cannot be cut by file machines hitherto constructed.

To enable others skilled in the art to understand my invention, I will describe its construction and operation.

In the accompanying drawings, A represents the frame that supports the working parts of the machine. B is the table or bed-plate, the rear end of which is supported upon the rear part of the frame A. The front end of said table B is supported upon a flange which is formed upon the rear side of the front part of frame A. The adjustable way, C, is pivoted to the front side of the frame A by means of a bolt, D, which passes through a hole in said frame; and this way C is further secured in place by the bolt E, passing through a curved slot, F, in the lower extension of the way, and through a hole in the frame A, as represented. The way C may be adjusted by loosening the clamping nut on the bolt E, and inclining the way either to the right or to the left at any desired angle, after which such inclination can be preserved by tightening the nut on said bolt again. This adjustment enables the machine to cut both angles or bevelled edges of a triangular sickle section, and is not required in a machine which is designed only for cutting files. Upon the front edge of the way C is formed a flange or track, G, for the shoes, H, of the table, I, to slide upon, as shown in the drawings. Upon the front of the adjustable way C are formed bearings, J, in which rotates the screw K that moves the sliding table I. The table I is pivoted to the shoes H, upon which it slides, by the screws L, the ends of which rest in cavities formed in the upper sides of the said shoes. M is a thumb-screw, passing through the lower part of the table I, with its end resting against the front side of the adjustable way C. By means of this screw the inclination of the top plate of the table I is adjusted to adapt it to any given bevel of the edge of a sickle section. Upon the top of the table I is placed a clamp, N, for holding the section of a sickle while being cut. This clamp is pivoted to projections, O, which are formed on the top of said table, and is operated by the cam P, pivoted to said clamp, as represented in the drawings. The drawings represent the table I as being provided with only one clamp, but this table may be lengthened laterally and provided with two or more clamps, so that a second sickle section may be arranged on the table ready to be cut while the machine is operating upon the first. To the side of the lower part of the table I is pivoted a lever, R, to the inner short arm of which is hinged an arm, S, having a half nut, S', formed upon its upper end, the thread of which corresponds with the thread of the screw K. The arm S is also slotted, and into its slot enters the stationary guide pin T, to hold the said arm S in place while the machine is in operation. By raising the lever R the half nut S' is removed from contact with the screw K, and the forward motion of the sliding table I arrested when desired. Upon the outer end of the screw K is placed a pulley or pulleys, U, by means of which and the band V, motion is communicated from the pulley W, on the driving shaft X. This shaft X revolves in bearings, Y, on the rear end of the table B, and is driven by means of the pulley Z. Upon the shaft X, over the central part of the rear end of the table B, is placed a cam or trip wheel, A', which, as the shaft X rotates, trips the lever B', and operates the chisel or cutter C', attached to the other end of said lever. The lever B' is hung and pivoted to two projections, D', attached to the table B, by bolts which pass through oblong slots in said table, which enable the lever to be adjusted according to the requirements of the work to be done. The central part of the table B is cut away to allow space for the action of the spring E', one end of which is secured to the front part of the table B, as shown in fig. 2, and the other end presses against the under side of the short arm of the lever B', increasing the force of the descending stroke of the chisel C'. This chisel C' is secured in a socket in the front end of the lever B' by a set-screw, F', so that the said chisel may be set at any desired angle to cut either edge of the sickle sections. In the bottom of the vertical slot in frame A, in which the forward part of the lever B' works, is placed a rubber spring, G', to counteract the reaction of the chisel C'. H' is a catch arranged so as to catch beneath the lever B', and prevent the action of the chisel C', except when said catch is held back by means of the treadle I' and connecting rod J'. K' is a spring which forces the catch H' forward against the said lever B', when this catch is released by removing the pressure from the treadle I'.

In operating the machine, the adjustable way C is inclined in the proper direction and at the proper angle; the table I is adjusted by the screws L and M, and the section to be cut secured by the clamp N. Then, by depressing the lever R, the half nut S' is brought into contact with the screw K, and the table I is carried forward under the chisel C'. At the same time the lever B' is released from the catch H' by depressing the treadle I', and the chisel C' allowed to come into contact with the section clamped to the table I. When the section on the table I has passed the chisel C' the pressure upon the treadle I' is removed, which allows the catch H' to take hold of the lever B' and stop the action of the chisel C'. And by raising the lever R, the half nut S' is moved away from the screw K, and the table I allowed to slide back to its first position. By means of the different-sized pulleys, V and W, the table I may be made to move faster or slower, so as to cut coarser or finer teeth on the sections, as may be desired. By means of the adjusting screw which is applied beneath the table I, this table can be adjusted to a horizontal position and in a plane parallel to the upper surface of the way C, in which position the machine may be used for cutting files.

It will be seen from the above description that the sickle sections can be secured in such position upon a movable bed or table that their bevelled edges will be in a plane parallel to the edge of the chisel when struck by it. Also, that the table upon which the work is secured is applied to an adjustable way, by means of which the teeth upon both edges of a sickle section can be cut at any desired angle without changing the position of the chisel arm. By means of the cone pulleys, V and W, the relative speed of the chisel arm and table I can be regulated for cutting fine or coarse teeth, as may be desired. And by means of the catch H' and treadle I, the motion of the chisel arm can be arrested at any desired moment.

I do not confine my invention to the precise contrivances herein described, and represented in the drawings, for sustaining sickle sections in proper positions for having their bevelled edges serrated, as other devices may be employed for this purpose. Nor do I confine my invention to a vibrating chisel arm, as the chisel may be applied to a rectilinear reciprocating stock.

Having described one mode of carrying out my invention, what I claim as new, and desire to secure by Letters Patent, is—

1. An improved machine which is adapted for sustaining sickle sections beneath a reciprocating chisel in such position that the chisel will form serrations or teeth upon the bevelled edges of said sections, constructed substantially as described.

2. The combination of an adjustable table I, with an adjustable way C, a feeding screw K, a half nut connection S', and a file-cutting chisel, or a chisel which is adapted for cutting teeth upon sickle sections, substantially as described.

3. The construction, substantially as described, of the adjustable way C, for receiving and supporting a reciprocating table, and admitting of said table being adjusted at different angles with respect to the cutting edge of a chisel C', substantially as described.

4. The arrangement of the adjustable table I upon the adjustable way C, so as to move at right angles to the chisel arm B, beneath the chisel C', substantially as described.

5. Sustaining the adjustable table I upon the way C, by means of adjustable bearings, substantially as described.

6. In combination with an adjustable table I, and an adjustable way C, I claim the means, substantially as described, for feeding the said table with a fast or slow movement, according to the size of the teeth required upon the bevelled edges of the sickle sections, substantially as specified.

7. Constructing the upper portion of the frame A with a vertical slot through it for receiving and guiding the chisel arm B', and also for receiving a spring, G', upon which said arm strikes in its descending strokes, said slot being arranged directly over the axis of the way C, substantially as described.

8. The combination of the spring latch H', and treadle I', with the means herein described for cutting sickle sections or files, substantially as and for the purpose set forth.

9. The sliding adjustable table I, with its clamp or clamps N, its screws L and M, nut S', feed screw K, in combination with the adjustable way of a machine for cutting sickle sections or files, substantially as described.

10. The adjustable way C, in combination with the frame A, of the machine, both being constructed and arranged substantially as and for the purposes described.

SAMUEL C. HALL.

Witnesses:
JAMES D. ROBINSON,
N. S. MURPHY.